V. BARTON.
ROD CUTTER.
APPLICATION FILED SEPT. 20, 1921.

1,438,888.

Patented Dec. 12, 1922.
2 SHEETS—SHEET 1.

Vincent Barton,
INVENTOR.

BY
Geo. P. Kimmel.
ATTORNEY.

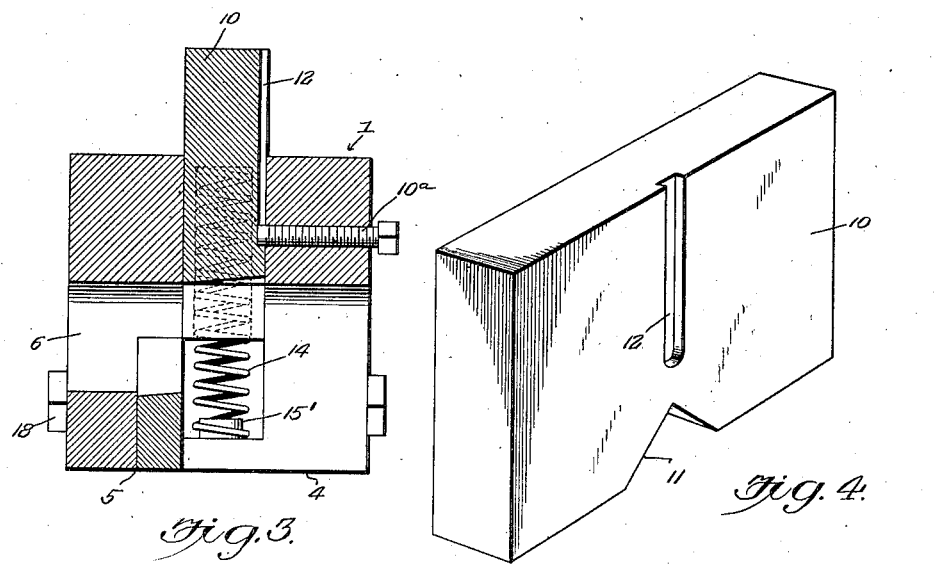
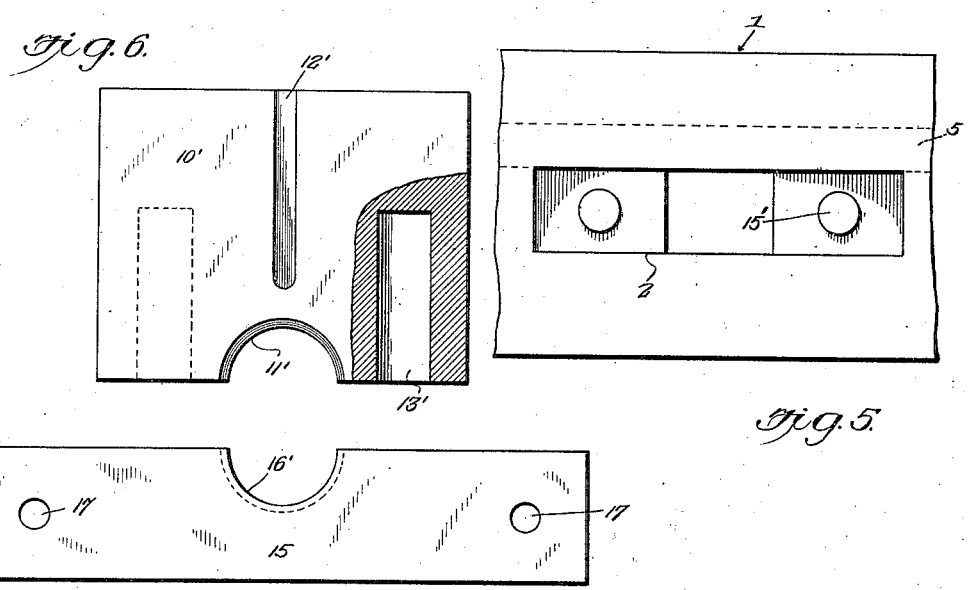

Patented Dec. 12, 1922.

1,438,888

UNITED STATES PATENT OFFICE.

VINCENT BARTON, OF PORT ANGELES, WASHINGTON.

ROD CUTTER.

Application filed September 29, 1921. Serial No. 501,898.

*To all whom it may concern:*

Be it known that I, VINCENT BARTON, a citizen of the United States, residing at Port Angeles, in the county of Clallam and State of Washington, have invented certain new and useful Improvements in Rod Cutters, of which the following is a specification.

This invention relates to rod cutters or shears.

The object of the invention is to provide a cutter of this character so constructed that it will quickly sever rods of various sizes and cross sectional shapes and which is simple, durable and compact, as well as inexpensive to manufacture and convenient and efficient in use.

Another object is to provide a device of this character, the movable blade of which is spring returned to facilitate the rapid feeding and cutting of a rod into sections.

Another object is to provide means constructed to prevent the movable blade from being expelled by its springs and yet not interfere with its rapid operation.

Still another object is to equip a device of this character with a gage for regulating the length of the rod section to be cut so that pieces of uniform length may be quickly severed without necessitating any change after the gage is once set.

With these and other objects in view, the invention consists in certain novel features of construction as hereinafter shown, described and claimed.

In the accompanying drawings:

Fig. 3 is a transverse vertical section.

Fig. 4 is a detail perspective view of the movable cutter blade.

Fig. 5 is a plan view with the movable cutter blade removed and with parts broken out for convenience in illustration.

Fig. 6 is a front elevation with parts broken out and in section of the movable cutter blade constructed for use in severing round rods; and Fig. 7 is a side elevation of the cooperating fixed blade to be used in connection with the blade shown in Fig. 6.

Figure 1:
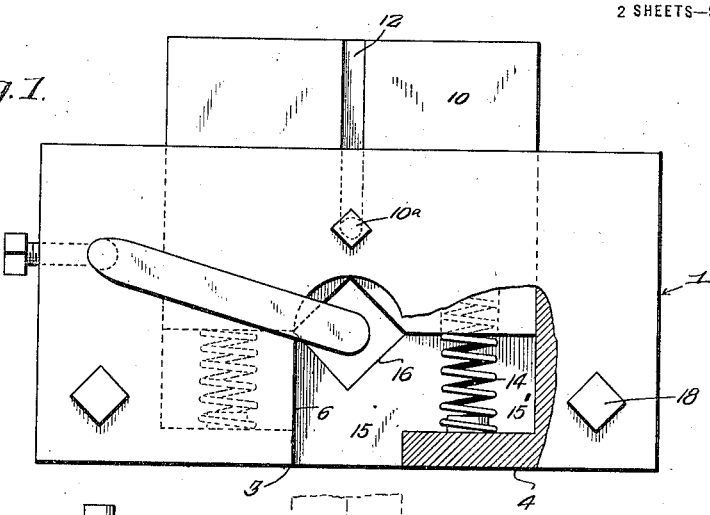
Figure 1 represents a side elevation of a cutter constructed in accordance with this invention with the parts in position as shown ready for the insertion of the square rod to be cut.

The cutter shown in Figs. 1 to 5 is designed for use in cutting rods, polygonal in cross section, while Figs. 6 and 7 show cooperating blades for use in cutting cylindrical rods, the main or body portion of the cutter in connection with which these blades are used is the same, and various sets or pairs of cutters may be provided, the several pairs being readily interchangeable as will be hereinafter more fully described.

In the embodiment illustrated the body 1 of the cutter is shown rectangular in configuration and is provided in its upper ends with a socket 2, in which is designed to be mounted and to reciprocate the movable cutter blade 10, the socket 2 opening through the bottom of the body 1, as shown at 3.

The bottom 4 of the body 1 is slotted longitudinal throughout its entire length, as shown at 5, to form a seat for the fixed cutter blade 15 which is here shown of less thickness than the movable blade 10 and is equipped with a rod receiving notch 16 formed in its inner edge and is designed to cooperate with a similar notch 11 formed in the inner edge of blade 10. The fixed blade 15 is inserted in the seat 5, formed in the bottom of the body 1, and is secured in position by bolts 18, passing transversely through the body 1 and through the opening 17 near the ends of the blade 15, as is shown clearly in Figs. 1 and 2.

The bottom of the socket 2 on opposite sides of the recess 6, forms housings or chambers for coiled springs 14 and are equipped with studs 15', which operate as retainers to hold the springs 14 against lateral movement. The lower ends of the springs 14 are engaged with the studs 15', as is shown clearly in Fig. 1 and their other ends are housed in sockets 13, formed in the lower face of blade 10 near the opposite ends thereof, as is shown clearly at 13 in Fig. 2 and at 13' in Fig. 6.

The movable blade 10 is provided on one face with a peripheral groove 12, which opens through the top of the blade and terminates at its lower or inner end, at a point adjacent the top of the notch 11 of said blade, as is shown clearly in Fig. 4. This groove 12 is designed to receive the inner end of a bolt 10ª which is threaded through one side wall of the body 1 above the recess 6 therein and operates as a stop for limiting outward movement of said blade.

The notches 11 and 16 in the blades 10 and 15 respectively are shown substantially V-shaped in form so that when in normal position a rectangular opening will be formed between the inner end of the blade to receive a square rod R to be cut.

The blades 10' and 15" shown in Figs. 6 and 7 are exactly like those shown in the other figures except that the notches 11' and 16' which form the cutting edges of these blades are made semi-circular to cut rods cylindrical in cross sectional contour. The spring receiving sockets 13' are the same as those shown at 13 in Fig. 2 and the fixed blade 15" is equipped at its opposite ends with apertures 17 for the passage therethrough of the securing bolts 18.

Figure 2:
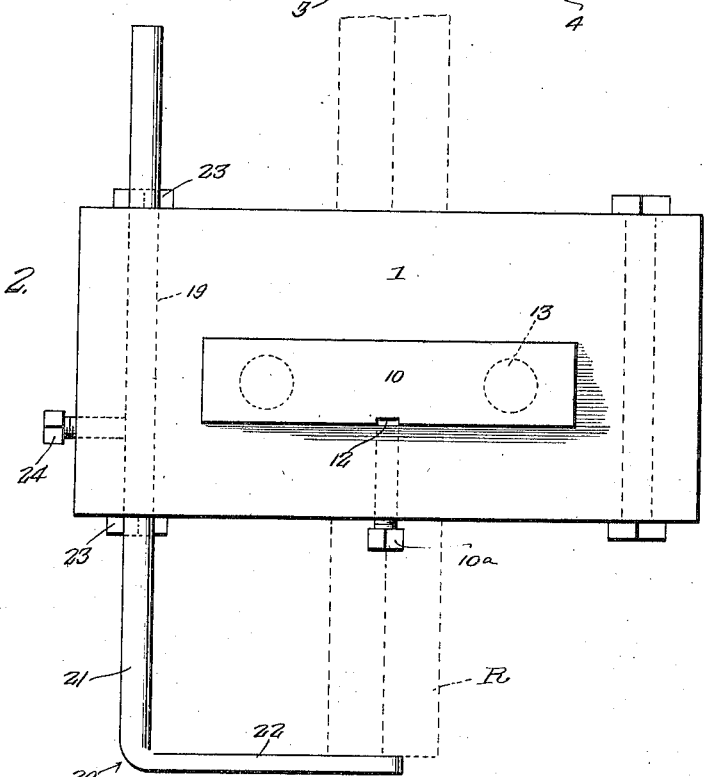
Fig. 2 is a plan view thereof with the rod to be cut shown in dotted line.

A bore 19 extends transversely through the body 1 near one end thereof, as is shown clearly in Fig. 2, being designed to receive the shank 21 of a gage 20, here shown L-shaped in form, the short arm 22 thereof being flattened and adapted to be swung into alinement with the opening in the body through which the rod R to be cut is designed to be inserted.

The shank 21 of the gage 20 is preferably threaded and is held in adjusted position by a lock nut 23, so that the arm 22 which forms a stop adapted to engage the end of the rod to be cut may be positioned toward or away from the body 1 according to the length of the rod section or rod to be cut and when adjusted is locked by the nuts 23, so that the rod to be cut may be rapidly fed through the cutter and be severed by a blow on the upper or outer edge of the blade 10.

From the above description it will be obvious that when the blade 10 is inserted in the body 1 that the bolt 10ª is screwed into position, shown in Fig. 3, where its inner end or point enters the groove 12 a sufficient distance to cause it to engage the lower end of said groove when the blade is projected to its extreme outermost position, and prevent the blade from being expelled beyond the proper point by the springs 14, and yet the bolt is not sufficiently tight to bind on the blade and interfere with its rapid reciprocation.

In use the nuts 23 having been loosened, the parts being in the position shown in Figs. 1 and 3, the rod R to be cut is inserted transversely through the opening formed in the body 1 between the notched cutting edges 11 and 16 of the blades 10 and 15 and projected through the recess 6, according to the length of sections desired to be cut. When projected a sufficient distance the gage 20 is swung into the position shown in Fig. 2 with the arm 22 engaging the outer end of rod and when so positioned the lock nuts 23 are tightened and the gage securely held. It is of course understood, as is shown clearly in Fig. 3 that the blade 10 overlaps the blade 15, so that the rod to be cut is seated within the complementing notches 11 and 16 of the blades, so that the cutting edges will entirely embrace said rod. Then by striking the upper edge of blade 10 with sufficient force, the cutter is driven downwardly so as to sever the rod, it of course being understood that any suitable means may be employed for forcing the blade 10 downwardly into cutting engagement with the rod. Immediately the rod is severed the springs 14 will operate to quickly return blade 10 in position again ready for use, and the rod R may be fed through the body of the cutter until its outer end again abuts the stop 22 of the gage 20 and the operation above described is repeated.

If desired, additional locking means for the gage may be provided in the form of a bolt 24, shown in Fig. 2, which extends through one end of the body 1 into the bore 19, through which the rod passes.

The body 1 may be secured in position by any suitable means, not shown.

To change the cutting blades all that is necessary is to loosen the bolt 10ª and remove bolts 18 and then substitute the cutters 10' and 15" shown in Fig. 6 or any others having cutting notches shaped to conform to the configuration of the rods to be severed. After these blades are inserted bolts 18 are restored and secured and the bolt 10ª therein tightened up, as above described and the cutter will be ready for use in connection with a rod conforming in cross sectional contour to the shape of the notches carried by the blades.

The preferred embodiment of the invention is disclosed in the drawings and set forth in the specification, but it will be understood that any modifications within the scope of the claimed invention may be made in the construction without departing from the principle of the invention or sacrificing any of its advantages.

What I claim is:

1. A bar or rod cutter comprising a body portion formed with a transverse recess and further with a vertically disposed socket intersecting said recess and with a longitudinal slot offset with respect to the lower end of said socket and intersecting said recess, a stationary cutter secured in said slot, a vertically movable cutter mounted in said socket, and resilient elements arranged in the socket and extending into the vertically movable cutter.

2. A bar or rod cutter comprising a body portion formed with a transverse recess and further with a vertically disposed socket intersecting said recess and with a longitudinal slot offset with respect to the lower end of said socket and intersecting said recess, a stationary cutter secured in said slot, a vertically movable cutter mounted in said socket, resilient elements arranged in the socket and extending into the vertically movable cutter, and means carried by said body portion and extending in the vertically movable cutter for limiting the outward movement of the latter.

3. A bar or rod cutter comprising a body portion formed with a transverse recess and further with a vertically disposed socket intersecting said recess and with a longitudinal slot offset with respect to the lower end of said socket and intersecting said recess, a stationary cutter secured in said slot, a vertically movable cutter mounted in said socket, resilient elements arranged in the socket and extending into the vertically movable cutter, and an L-shaped gauge extending transversely through said body portion and adjustably connected therewith.

4. A bar or rod cutter comprising a body portion formed with a transverse recess and further with a vertically disposed socket intersecting said recess and with a longitudinal slot offset with respect to the lower end of said socket and intersecting said recess, a stationary cutter secured in said slot, a vertically movable cutter mounted in said socket, resilient elements arranged in the socket and extending into the vertically movable cutter, means carried by said body portion and extending in the vertically movable cutter for limiting the outward movement of the latter, and an L-shaped gauge extending transversely of said body portion and adjustably connected therewith.

5. A bar and rod cutter comprising a body portion formed with a transversely extending recess and further provided with a vertically disposed socket intersecting said recess and with a longitudinal slot offset with respect to the lower end of the socket and intersecting said recess, a pair of spaced studs mounted at the bottom of said socket, a stationary cutter secured in said slot, a vertically movable cutter mounted in said socket, and a pair of vertically disposed coiled springs having their lower ends surrounding said studs and their upper ends extended into said vertically movable cutter.

6. A bar and rod cutter comprising a body portion formed with a transversely extending recess and further provided with a vertically disposed socket intersecting said recess and with a longitudinal slot offset with respect to the lower end of the socket and intersecting said recess, a pair of spaced studs mounted at the bottom of said socket, a stationary cutter secured in said slot, a vertically movable cutter mounted in said socket, a pair of vertically disposed coiled springs having their lower ends surrounding said studs and their upper ends extended into said vertically movable cutter, said vertically movable cutter having one side formed with a groove and means carried by the body portion and extending in said groove for limiting the outward movement of the vertically movable cutter.

7. A bar or rod cutter comprising a body portion formed with a transversely extending recess and further provided with a vertically disposed socket intersecting said recess and with a longitudinal slot offset with respect to the lower end of the socket and intersecting said recess, a pair of spaced studs mounted at the bottom of said socket, a stationary cutter secured in said slot, a vertically movable cutter mounted in said socket, a pair of vertically disposed coiled springs having their lower ends surrounding said studs and their upper ends extended into said vertically movable cutter, said vertically movable cutter having one side formed with a groove, means carried by the body portion and extending in said groove for limiting the outward movement of the vertically movable cutter, and an L-shaped gauge extending transversely through and adjustably connected to said body portion.

In testimony whereof, I affix my signature hereto.

VINCENT BARTON.